United States Patent
Koch

(10) Patent No.: US 8,475,100 B2
(45) Date of Patent: Jul. 2, 2013

(54) WALL FASTENER WITH KNIFE BLADE AND A STRING

(75) Inventor: Frank Koch, Ogdensburg, NY (US)

(73) Assignee: Defelsko Corporation, Odgensburg, NY (US)

( * ) Notice: Subject to any disclaimer, the term of this patent is extended or adjusted under 35 U.S.C. 154(b) by 0 days.

(21) Appl. No.: 13/617,095

(22) Filed: Sep. 14, 2012

(65) Prior Publication Data

US 2013/0008016 A1    Jan. 10, 2013

Related U.S. Application Data

(63) Continuation of application No. 12/499,884, filed on Jul. 9, 2009.

(60) Provisional application No. 61/079,450, filed on Jul. 10, 2008, provisional application No. 61/089,173, filed on Aug. 15, 2008.

(51) Int. Cl.
*F16B 21/00* (2006.01)

(52) U.S. Cl.
USPC ............ 411/344; 411/550; 411/553; 411/999

(58) Field of Classification Search
USPC ................. 411/180, 340, 344, 477, 481, 550, 411/553, 923, 999
See application file for complete search history.

(56) References Cited

U.S. PATENT DOCUMENTS

| 412,981 | A | | 10/1889 | Sanford |
|---|---|---|---|---|
| 1,131,248 | A | | 3/1915 | Knight |
| 1,521,024 | A | | 12/1924 | Hubener |
| 1,521,025 | A | | 12/1924 | Hubener |
| 1,521,026 | A | | 12/1924 | Hubener |
| 1,597,573 | A | | 8/1926 | Blue |
| 2,301,135 | A | | 11/1942 | Molat |
| 2,919,089 | A | | 12/1959 | Durham |
| 3,204,265 | A | | 9/1965 | Fiekers et al. |
| 3,219,087 | A | | 11/1965 | Zahodiakin |
| 3,882,755 | A | | 5/1975 | Enstrom |
| 4,289,058 | A | * | 9/1981 | Paskert ................ 411/456 |
| 5,044,854 | A | | 9/1991 | Oh |
| 5,110,243 | A | | 5/1992 | Oh |
| 5,472,304 | A | | 12/1995 | Gold |
| 6,659,700 | B1 | * | 12/2003 | Farrell et al. ............ 411/450 |
| 6,866,458 | B2 | * | 3/2005 | Farrell et al. ............ 411/477 |
| 7,033,122 | B2 | * | 4/2006 | Farrell et al. ............ 411/477 |
| 2006/0083602 | A1 | | 4/2006 | Lemire |
| 2006/0228192 | A1 | * | 10/2006 | Chang ................ 411/451.3 |
| 2008/0089760 | A1 | * | 4/2008 | Yao ..................... 411/477 |

* cited by examiner

*Primary Examiner* — Roberta Delisle

(74) *Attorney, Agent, or Firm* — Buchanan Ingersoll & Rooney

(57) ABSTRACT

A wall fastener includes a nut having a major planar structure having a hole for receiving a screw, the major planar structure having a first end with two staggered knife edges on opposite sides of the major planar structure and a second end; and a string, wherein the string is detachably connected to the major planar structure.

16 Claims, 3 Drawing Sheets

WALL FASTENER WITH KNIFE BLADE AND A STRING

CROSS-REFERENCE TO RELATED APPLICATIONS

The present application is a continuation of Ser. No. 12/499,884, filed on Jul. 9, 2009, and which claims the benefit of U.S. Provisional Applications, Ser. Nos. 61/079,450 and 61/089,173, filed on Jul. 10, 2008 and Aug. 15, 2008, respectively. The entire contents of Ser. No. 12/499,884 and the provisional applications are incorporated herein by reference.

FIELD OF THE DISCLOSURE

The present disclosure relates to a wall fastener. More particularly, the present disclosure relates to a nut for a wall fastener for use in applications where it is difficult to gain access behind drywall to hold a nut while a bolt attaches to the nut.

BACKGROUND

Fasteners made from plastic or metal which attach themselves to a wall by expanding into a pre-drilled hole are known in the art. Drywall (e.g., Sheetrock®) is generally made from gypsum or plaster and does not have any appreciable anchoring strength to accommodate surface fasteners for the support of mirrors, paintings, kitchen and bathroom fixtures, curtain rods, etc.

Other types of fasteners such as plaster screws generally tend to pull free from drywall when slight stresses are applied because drywall composition provides little anchoring support for these types of fasteners.

Other fasteners are known as toggle-bolt type where the cross-member collapses to insert into the wall and then once through the hole, opens and can not be pulled back out. Due to the collapsible mechanisms they are complex and require a large hole through the wall. They are therefore less desirable, especially when multiple holes are required in close proximity to each other.

Many fasteners require considerable space in the back of the wall board which is not always available. Particularly, in buildings constructed with concrete blocks or having a poured concrete wall. In this instance, the drywall is typically attached to the concrete wall by shallow furring strips.

Accordingly, there remains a need for a wall fastener that can overcome the above-identified limitations. It will be clear to those of ordinary skill in the art, that the disclosed wall fastener can be used with other types of walls, in addition to drywall.

SUMMARY

A wall fastener system is described herein, and in particular, a nut for a wall fastener is described. The nut for the wall fastener comprises a major planar structure having a hole for receiving a screw or bolt, the major planar structure having a first end with one or more staggered knife edges and a second end; and a string forming a loop, wherein the string loop is detachably connected to the major planar structure in an area adjacent to the hole for receiving the screw.

DETAILED DESCRIPTION OF THE PREFERRED EMBODIMENTS

The term "wall" and "drywall" are used interchangeably in the present disclosure and refer to the common construction product made from gypsum or plaster to form walls for finishing construction of interior walls and ceilings.

The wall fastener described herein is preferably made from a metal or a metal alloy. In an exemplary embodiment, the wall fastener is made of a metal or metal alloy such as steel, tempered steel, stainless steel, titanium, brass, bronze, monel, and/or silicon bronze. However, one of ordinary skill in the art may find that other materials are also suitable.

Figure 1:
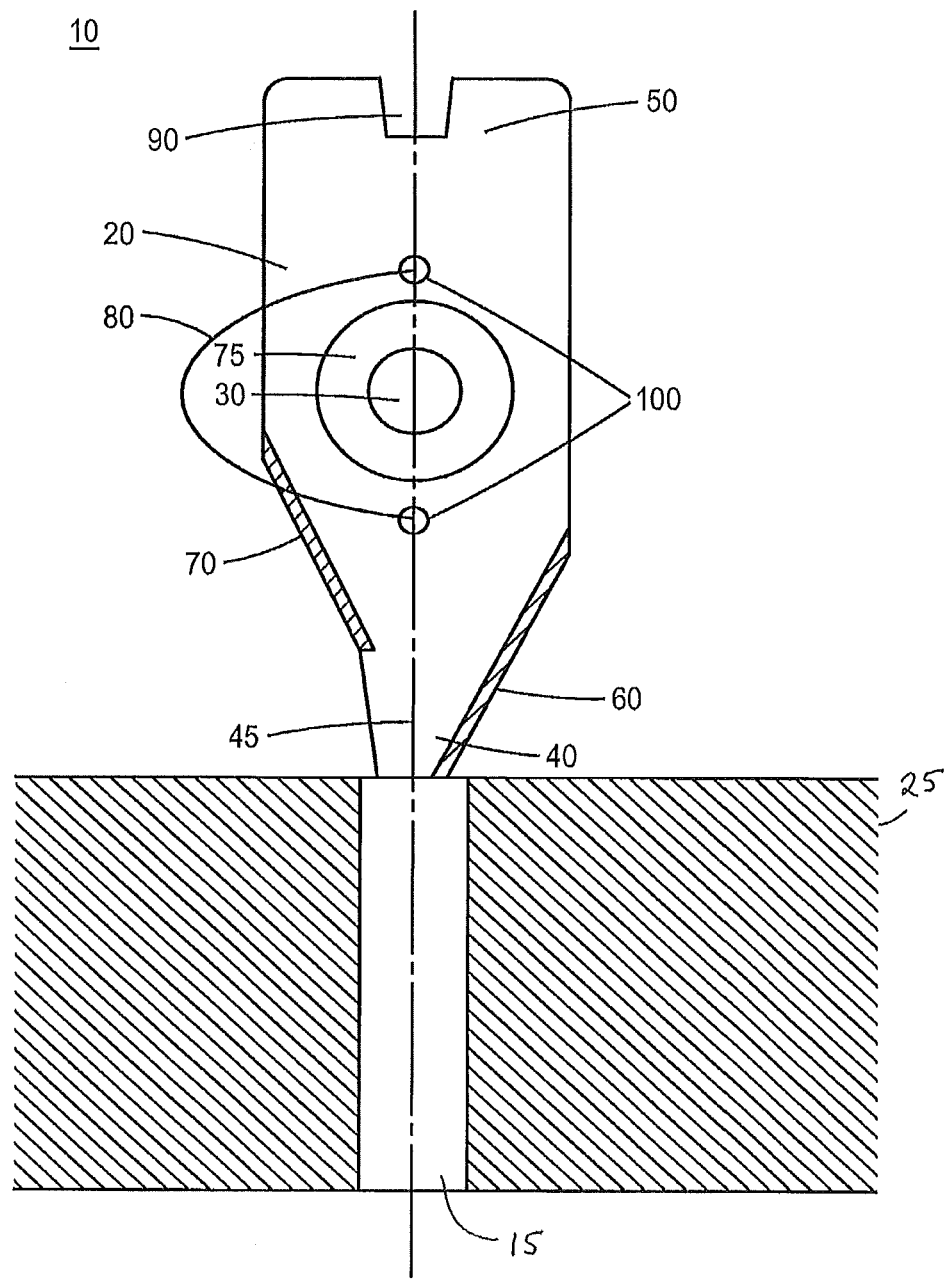
FIG. 1 is a schematic representation of a nut for the wall fastener according to a preferred embodiment of the present invention.

As shown in FIG. 1, the nut 10 for the wall fastener has a major planar structure referred to as the plate-nut 20 in this disclosure. The plate-nut 20 has a first end 40 for guiding and inserting into the wall and a second end 50 with a notch 90 where a screwdriver blade can be inserted sideways. The notch 90 aids in positioning and insertion of the wall fastener onto and inside the wall. However, some embodiments may not include the notch 90.

The first end 40 has two staggered knife blades 60 and 70 at opposite sides (see FIG. 1). This configuration of the two staggered knife blades at opposite sides permits both blades to cut differently from each other as to cutting depth, pressure distribution, while hammering into the wall. This may help to avoid damage to the backside of the wall, especially at the point of exit of the wall fastener.

The presently described nut 10 for the wall fastener can be installed by drilling a hole 15 in a wall 25. In an exemplary embodiment, the drilled hole can be about 5.0 mm or about 3/16 inch in diameter. Then, the first end 40 of the plate-nut 20 can be inserted into the drilled hole. Insertion of the plate-nut 20 can be aided by hammering until the plate-nut 20 is flush with the wall. A protruding portion of the plate-nut 20 can be pushed through the wall with a nail or a small screw driver while holding on to a loop of string 80 which is connected to the plate-nut 20 via holes 100. A longitudinal axis of the plate-nut is identified by reference numeral 45.

The plate-nut 20 includes a hole 30 in a central portion thereof for receiving a screw or bolt. The hole 30 is surrounded by a flange 75 that extends from one surface of the otherwise flat plane of the plate-nut 20.

As the plate-nut 20 passes through the wall, the plate-nut 20 creates two slots on opposite sides of the hole 15. After the plate-nut 20 has completely passed through the wall, the string loop 80 is pulled to position the plate-nut 20, as desired, parallel to and on the backside of the wall 25. Pulling on the string loop 80 will cause the string loop 80 to move into the newly created slots and will position the plate-nut 20 such that the hole 30 in the plate-nut is aligned with the drilled hole 15 in the wall 25. Tension can also be applied to the string loop 80 while inserting the screw to aid in engaging the screw with the hole 30 in the plate-nut 20. Because of the arrangement of the holes 100, the string loop 80 will prevent the plate nut 20 from rotating while the screw is being applied. After the screw is inserted into the hole 30 the string loop 80 can be removed by using a pair of scissors or a knife.

The string of the string loop 80 can be made of any suitable material, such as nylon, and can be optionally cut with a common cutting instrument such as a pair of scissors or a knife. For example, the string loop can be made from plastic, metal and/or a natural fiber.

In an exemplary embodiment, the wall fastener is about 11 mm wide and about 25 mm long. The hole 30 is about 3.2 mm in diameter. The notch 90 is about 4.75 mm deep, and the portion of the leading edge between the edges 60 and 70 is about 3 mm wide. However, other dimensions can also used.

Some of the advantages of the wall fastener described herein and shown in FIG. 1 include: (i) small size and good load bearing capacity, (ii) compared to its load bearing capacity the wall fastener has minimal intrusion into the dry-wall thus minimizing the hole in the wall at the point of entry, (iii) minimal to no damage to the backside of the wall compared to expansion type wall fasteners, (iv) no special tools are required to install, (v) easy to install, (vi) easy to manufacture due to its simple construction, (vii) inexpensive to produce, (viii) several of these fasteners can be installed in close proximity of each other without significantly impacting the strength and integrity of the wall because the presently described wall fastener causes minimal intrusion and damage compared with traditional expansion type wall fasteners, and (ix) desirable as a replacement fastener where other expansion type fasteners have failed.

Figure 2:
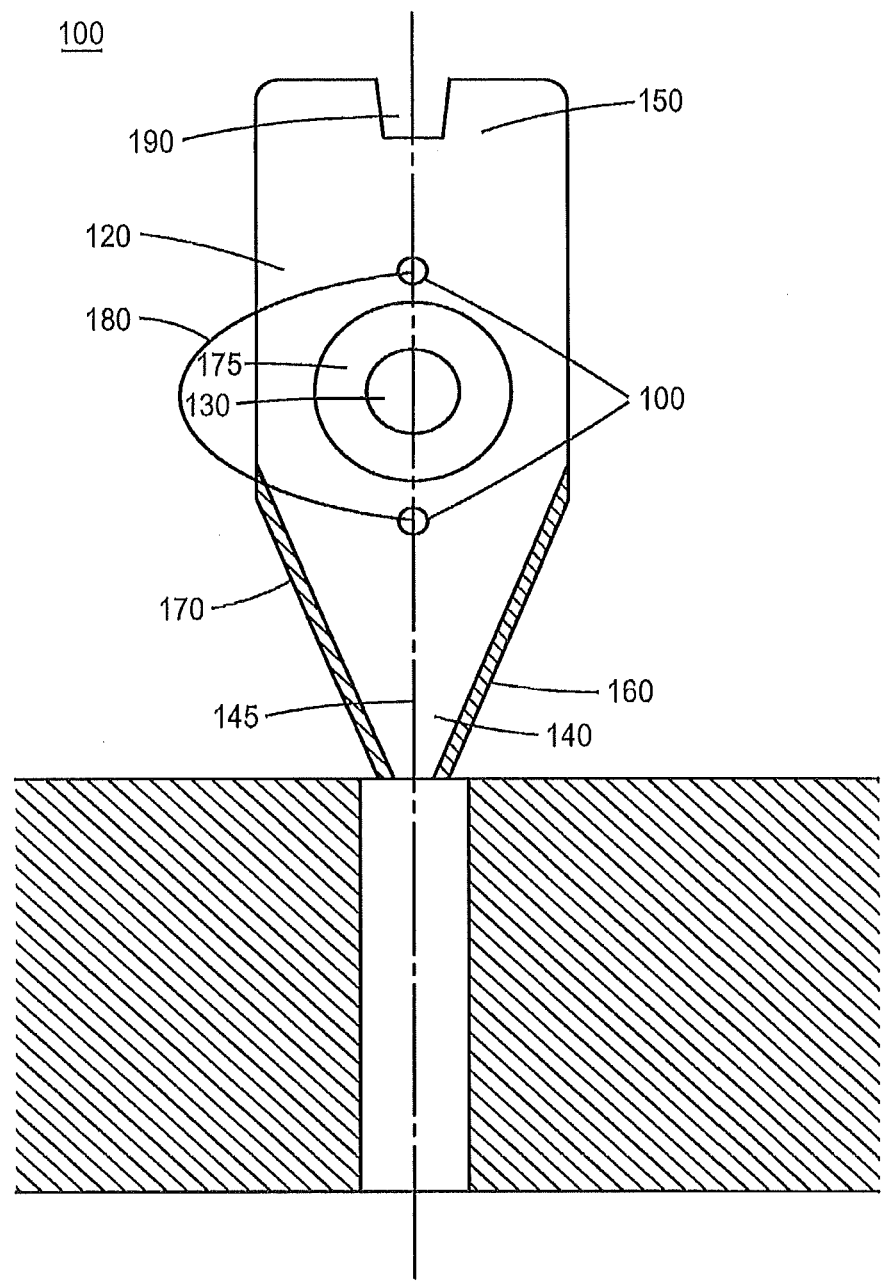
FIG. 2 is a schematic representation of a nut for the wall fastener according to a second preferred embodiment of the present invention.

In the above disclosed embodiment 10, the knife edges are staggered and are arranged at an angle of about 26 degrees from the longitudinal axis 45 of the nut 10. However, in an alternative embodiment 100, illustrated in FIG. 2, the knife edges 160, 170 are not staggered, and they are arranged at an angle of about 19 degrees from the longitudinal axis 145 of the plate-nut 120. In the alternative embodiment 100, because the knife edges 160, 170 are not staggered, the plate-nut 120 is symmetrical. The remaining features of the second embodiment 100 are substantially the same as the first embodiment 10. Corresponding reference numerals have been increased by 100 in the second embodiment.

Figure 3:
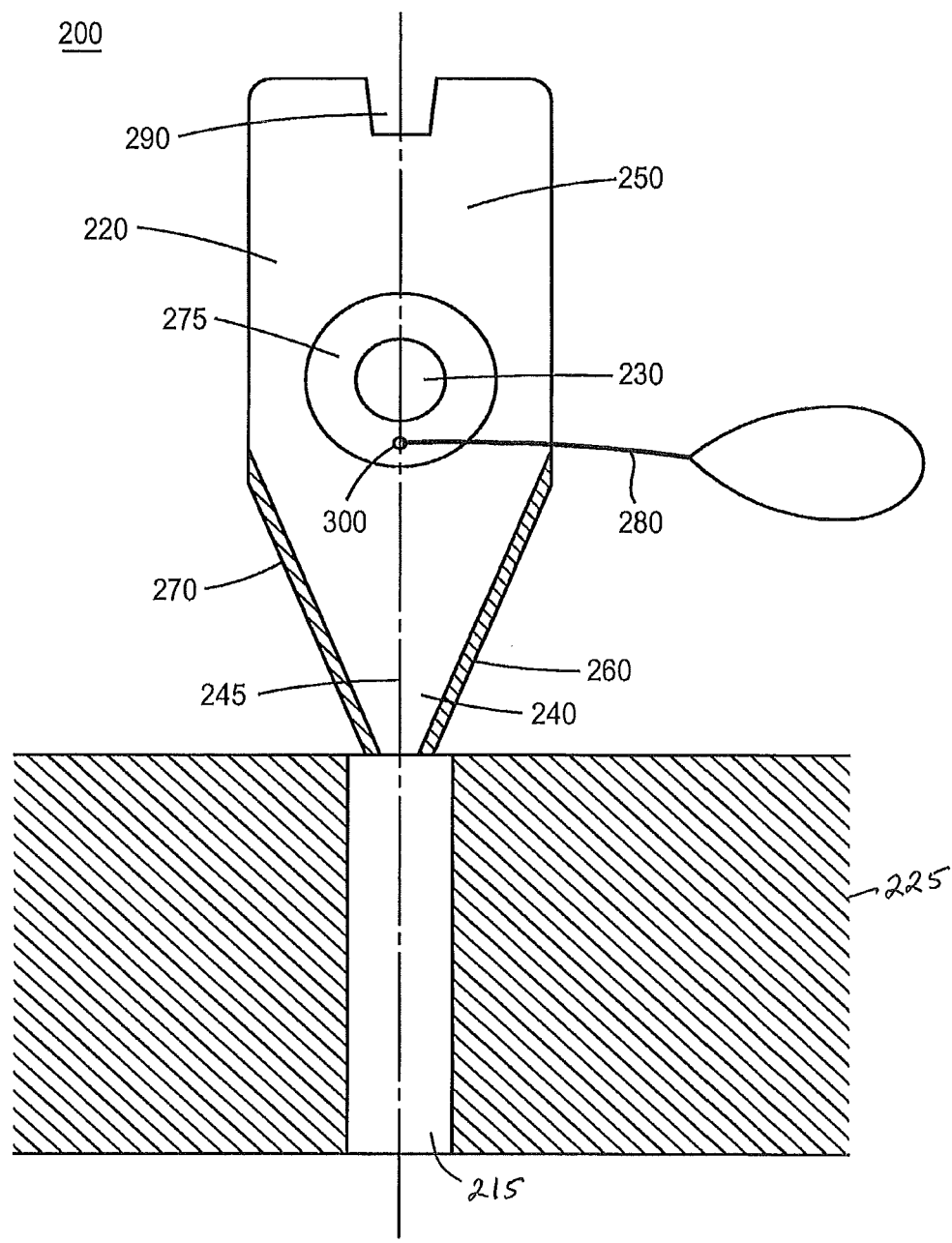
FIG. 3 is a schematic representation of a nut for the wall fastener according to a third preferred embodiment of the present invention.

A third embodiment 200 is shown in FIG. 3. The nut for the wall fastener 200 has a major planar structure referred to as the plate-nut 220 in this disclosure. The plate-nut 220 has a first end 240 for guiding and inserting into a wall 225 and a second end 250 with a notch 290 where a screwdriver blade can be inserted sideways. The notch 290 aids in positioning and insertion of the wall fastener onto and inside the wall 225. However, some embodiments may not include the notch 290.

The first end 240 has knife edges 260, 270 that are not staggered. The knife edges 260, 270 are arranged at an angle of about 19 degrees from the longitudinal axis 245 of the plate-nut 220.

The plate-nut 220 includes a hole 230 in a central portion thereof for receiving a screw or bolt. The hole 230 is surrounded by a flange 275 that extends from one surface of the otherwise flat plane of the plate-nut 220.

The presently described nut for the wall fastener 200 can be installed by drilling a hole 215 in the wall 225. In an exemplary embodiment, the drilled hole 215 can be about 5.0 mm or about 3/16 inch in diameter. Then, the first end 240 of the plate-nut 220 can be inserted into the drilled hole. Insertion of the plate-nut 220 can be aided by hammering until the plate-nut 220 is flush with the wall. A protruding portion of the plate-nut 220 can be pushed through the wall with a nail or a small screw driver while holding on to a string 280 which is connected to the plate-nut 220 via a hole 300 provided in the flange 275 of the hole 230. The string 280 can be a simple straight length of string, or it can have a loop formed at the end of it to facilitate holding. The diameter of the hole may be about 0.8 mm.

The string can be threaded through the hole and secured to the plate-nut by having a stop at the end of the string that will not pass through the hole. The stop can be simply a knot or a melted portion of the string. Alternatively, a notch in the flange can be used instead of the hole 300.

As the plate-nut 220 passes through the wall, the plate-nut 220 creates two slots on opposite sides of the hole. After the plate-nut 220 is completely through the wall, the string loop 280 is pulled to position the plate-nut 220, as desired, parallel to and on the backside of the wall. Pulling on the string loop 280 in an upward direction will cause the string loop 280 to move into the newly created slot at the top, and positions the plate-nut 220 such that the hole 230 in the plate-nut is aligned with the drilled hole in the wall. Gravity will ensure that the plate-nut 220 swings down so that the hole 230 is in alignment with the hole drilled in the wall. Tension can also be applied to a string loop 280 while inserting the screw to aid in engaging the screw with the hole 230 in the plate-nut 220. After the screw is inserted into the hole 230 the string loop 280 can be removed by using a pair of scissors or a knife.

The string of the string loop 280 can be made of any suitable material, such as nylon, and can be optionally cut with a common cutting instrument such as a pair of scissors or a knife. For example, the string loop can be made from plastic, metal and/or a natural fiber. The string 280 may have sufficient stiffness that when the nut-plate 220 is first pushed through the wall, the nut-plate 220 hangs by the string 280 such that the bottom of the nut-plate 220 is touching the back of the wall, but the top end 240 of the nut-plate remains spaced from the wall. As the string 280 is pulled, then the nut-plate lies flush against the wall.

In all of the exemplary embodiments, the wall fastener is preferably about 11 mm wide and about 25 mm long. The hole 30, 130, 230 is preferably about 3.2 mm in diameter. The notch 90, 190, and 290 is preferably about 4.75 mm deep, and the portion of the leading edge between the edges 60, 160, 260 and 70, 170, 270 is preferably about 3 mm wide. However, other dimensions can also used.

Additional embodiments are also contemplated. For example, and without limitation, the third embodiment can also be made with staggered knife edges, such as are used in the first embodiment.

Some of the advantages of the wall fastener described herein include: (i) small size and good load bearing capacity, (ii) compared to its load bearing capacity the wall fastener has minimal intrusion into the dry-wall thus minimizing the hole in the wall at the point of entry, (iii) minimal to no damage to the backside of the wall compared to expansion type wall fasteners, (iv) no special tools are required to install, (v) easy to install, (vi) easy to manufacture due to its simple construction, (vii) inexpensive to produce, (viii) several of these fasteners can be installed in close proximity of each other without significantly impacting the strength and integrity of the wall because the presently described wall fastener causes minimal intrusion and damage compared with traditional expansion type wall fasteners, and (ix) desirable as a replacement fastener where other expansion type fasteners have failed.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A nut for a wall fastener comprising:
   a planar structure having a longitudinal direction with a first end and a second end opposite the first end,
   a main hole for receiving a screw extending through a portion of the planar structure between the first end and the second end,
   the planar structure having a knife edge at the first end and a notch at the second end, wherein the planar structure includes two staggered knife edges;
   a minor hole for receiving a string extending through the planar structure at a location adjacent the main hole, and
   a string detachably connected to the planar structure through the minor hole, the minor hole being located such that the weight of the nut causes the main hole to be suspended below the minor hole when the nut is suspended by the string.

2. The nut for a wall fastener of claim 1, wherein the nut is made of a metal or a metal alloy.

3. The nut for a wall fastener of claim 1, wherein the nut is made of steel, tempered steel, stainless steel, titanium, brass, bronze, monel, and/or silicon bronze.

4. The nut for a wall fastener of claim 1, wherein the major planar structure is about 11 mm wide and about 25 mm long.

5. The nut for a wall fastener of claim 1, wherein the string is made from plastic.

6. The nut for a wall fastener of claim 1, wherein the string is made from a natural fiber.

7. The nut for a wall fastener of claim 1, wherein the string is made from metal.

8. A nut for a wall fastener comprising:
   a planar structure having a longitudinal direction with a first end and a second end opposite the first end,
   a main hole for receiving a screw extending through a portion of the planar structure between the first end and the second end,
   the planar structure having a knife edge at the first end and a notch at the second end;
   a minor hole for receiving a string extending through the planar structure at a location adjacent the main hole, and
   a string detachably connected to the planar structure through the minor hole, the minor hole being located such that the weight of the nut causes the main hole to be suspended below the minor hole when the nut is suspended by the string;
   wherein the planar structure includes a flange surrounding the main hole and a smaller hole extending through the flange, and the string is fastened through the smaller hole.

9. The nut for a wall fastener of claim 8, wherein the planar structure includes two staggered knife edges.

10. The nut for a wall fastener of claim 8, wherein the planar structure includes two knife edges arranged symmetrically on the planar structure.

11. The nut for a wall fastener of claim 8, wherein the nut is made of a metal or a metal alloy.

12. The nut for a wall fastener of claim 8, wherein the nut is made of steel, tempered steel, stainless steel, titanium, brass, bronze, monel, and/or silicon bronze.

13. The nut for a wall fastener of claim 8, wherein the major planar structure is about 11 mm wide and about 25 mm long.

14. The nut for a wall fastener of claim 8, wherein the string is made from plastic.

15. The nut for a wall fastener of claim 8, wherein the string is made from a natural fiber.

16. The nut for a wall fastener of claim 8, wherein the string is made from metal.

* * * * *